United States Patent [19]

Pedersen et al.

[11] Patent Number: 5,483,650

[45] Date of Patent: Jan. 9, 1996

[54] METHOD OF CONSTANT INTERACTION-TIME CLUSTERING APPLIED TO DOCUMENT BROWSING

[75] Inventors: Jan O. Pedersen, Palo Alto; David R. Karger, Stanford; Douglass R. Cutting, Menlo Park, all of Calif.

[73] Assignee: Xerox Corporation, Stamford, Conn.

[21] Appl. No.: 79,292

[22] Filed: Jun. 21, 1993

Related U.S. Application Data

[63] Continuation-in-part of Ser. No. 790,316, Nov. 12, 1991, Pat. No. 5,442,778.

[51] Int. Cl.⁶ .................................................. G06F 17/30
[52] U.S. Cl. ................ 395/600; 364/225.6; 364/419.13; 364/419.19; 364/DIG. 1; 395/144
[58] Field of Search ..................................... 395/600, 144, 395/140, 141; 364/419.13, 419.19, 401, 225.6; 382/39; 340/146.2

[56] References Cited

U.S. PATENT DOCUMENTS

| | | | |
|---|---|---|---|
| 4,956,74 | 9/1990 | Shibamiya et al. | 395/600 |
| 4,972,349 | 11/1990 | Kleinberger | 395/600 |
| 5,075,896 | 12/1991 | Wilcox et al. | 382/39 |
| 5,168,565 | 12/1992 | Morita | 395/600 |
| 5,179,643 | 1/1993 | Homma et al. | 390/140 |
| 5,257,365 | 10/1993 | Powers et al. | 395/600 |
| 5,278,980 | 1/1994 | Pedersen et al. | 395/600 |
| 5,325,298 | 6/1994 | Gallant | 364/419.19 |

OTHER PUBLICATIONS

"Information Theater Could Overthrow Traditional Information Refinery", D. Coursey, MIS Week, Jun. 25, 1990.
"Information Theater Versus Information Refinery", D. Cutting et al. (Xerox), Mar. 27, 1990, Stanford University.

"Understanding Multi–Articled Documents", Tsujimoto et al.; Jun. 1990; Proc. 10th International Conference of Pattern Recognition.

"Recent Trends in Hierarchic Document Clustering: A Critical Review", P. Willett, Information Processing & Management, vol. 24, No. 5, pp. 577–597, 1988, Permagon Press, Inc.

"Scatter/Gather: A Cluster–based Approach to Browsing Large Document Collections", D. Cutting et al. (Xerox), pp. 1–12.

Salton, Gerard, *Automatic Text Processing: The Transformation, Analysis, and Retrieval of Information by Computer*, pp. 167–175, 326–345, 1989.

Concepts and effectiveness of the cover–coefficient–based clustering methodology for text data bases, by Fazli Can et al.; ACM, V15, n4, p. 483(35); Dec., 1990.

*Primary Examiner*—Thomas G. Black
*Assistant Examiner*—Hosain T. Alam
*Attorney, Agent, or Firm*—Oliff & Berridge

[57] ABSTRACT

Arbitrarily large document collections are processed by expanding a focus set having at least one initial metadocument into a plurality of subsequent metadocuments. The number of subsequent metadocuments is approximately equal to a predetermined maximum number. The subsequent metadocuments are then clustered into a predetermined number of new metadocuments, which are summarized and presented to a user. The focus set is redefined to include only user-selected new metadocuments.

13 Claims, 10 Drawing Sheets

METHOD OF CONSTANT INTERACTION-TIME CLUSTERING APPLIED TO DOCUMENT BROWSING

This application is a continuation-in-part of application Ser. No. 07/790,316, filed Nov. 12, 1991, now U.S. Pat. No. 5,442,778, the disclosure of which is incorporated herein by reference.

BACKGROUND OF THE INVENTION

1. Field of the Invention

The present invention relates to a method of processing a corpus of electronically stored documents, and in particular to a method of processing arbitrarily large document collections useful in document browsing.

2. Description of Related Art

Document browsing is a powerful tool used in accessing large text collections. BrowsinG, which can be distinguished from searching because browsing is query-free, works well for information needs either too general or too vague to be usefully expressed as a query in some search language. For example, a user may be unfamiliar with vocabulary appropriate for describing a topic of interest, or may not wish to commit to a particular choice of words. Indeed, a user may not be looking for anything specific at all, but instead may wish to explore the general information content of the collection. Helpful in this context is an information access system including a navigable collection outline that both suggests the collection's contents and allows a user to focus attention on some topic-coherent subset of the contents.

One such browsing system is described in a paper entitled "Scatter/Gather: A Cluster-Based Approach to Browsing Large Document Collections," Proceedings of the Fifteenth Annual International ACM SIGIR Conference, pages 318–329, June 1992, by Cutting, Karger, Pedersen, and Tukey, which is incorporated herein by reference. This system and method are also disclosed in the above-incorporated application Ser. No. 07/790,316, now U.S. Pat. No. 5,442,778.

In the Scatter/Gather method, attention is always directed toward a focus set of documents potentially interesting to a user. Initially the focus set may be an entire document collection. The documents in the focus set are clustered into a small number of topic-coherent subsets, or clusters, of documents. The terms "clustering" and "scattering" are used synonymously; thus it may be said that the documents in the focus set are scattered into the clusters.

In Scatter/Gather, cluster summaries, a table of contents outlining the documents of the focus set, are developed and presented to the user, for example on a computer display screen. The user then identifies and selects clusters that appear most interesting. The selected clusters define a new, smaller focus set that is the union of the selected clusters. The process is repeated a desired number of times until the user wishes to access documents individually or employ a query-based search method.

Cluster summaries comprise suggestive text determined automatically from documents in each cluster. Each cluster summary includes two types of information: a list of topical words occurring most often in the documents of the cluster, and the titles of a few typical documents in the cluster. The summaries are based on cluster profiles, which reflect words appearing in documents in the cluster.

Scatter/Gather is not necessarily a stand-alone information access tool, but can be used in tandem with search methods such as boolean search or similarity search. Illustrative is an analogy to paper copies of reference books, which offer two access modes: a table of contents in the front for browsing, and an index in the back for more directed searches. Scatter/Gather is not necessarily used to find particular documents, but instead, by giving exposure to the vocabulary presented in cluster summaries, helps guide complimentary search methods. For example, a cluster profile may be used in a similarity search in a query against the entire collection. Conversely, Scatter/Gather can be used to organize the results of word-based queries that retrieve too many documents.

Figure 4:
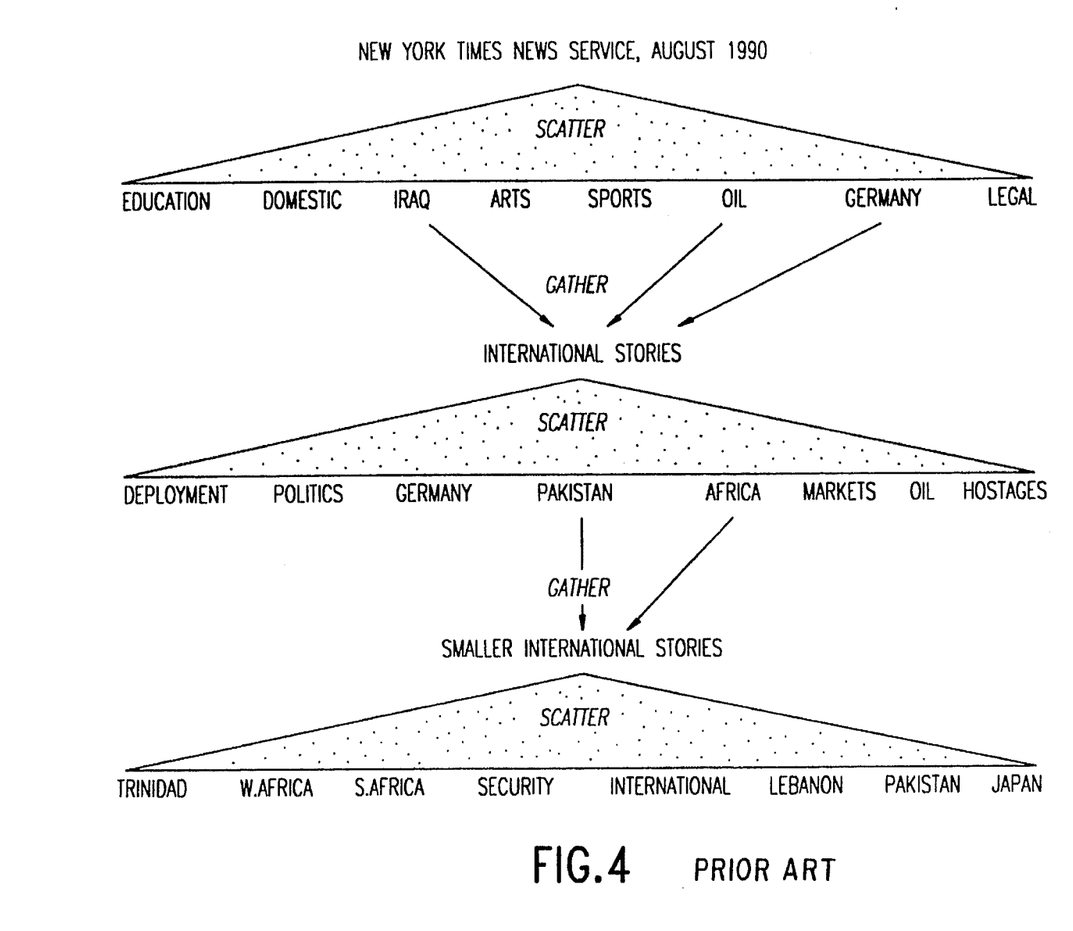
FIG. 4 is a diagram broadly illustrating the Scatter/Gather procedure.

An example of Scatter/Gather will now be described. FIG. 4 represents a Scatter/Gather session over a text collection of about 5,000 articles posted to the New York Times News Service in August, 1990. Single-word labels instead of actual cluster summaries are presented, to simplify the figure.

Suppose a user's information need is to determine generally what happened in August 1990. It would be difficult to construct a word-based query effectively representing this information need, because no specific topic description exists. The user might consider general topics, such as "international events," but that topic description would not be effective because articles concerning international events typically do not use those words.

With Scatter/Gather, rather than being forced to provide certain terms, a user is presented with a set of cluster summaries—an outline of the collection. The user need select only those clusters that seem potentially relevant to the topic of interest. In FIG. 4, the major stories of the month are immediately obvious from the initial scattering: Iraq invades Kuwait, and Germany considers reunification. This leads a user to focus on international issues, selecting the "Iraq," "Germany," and "Oil" clusters. These three clusters are gathered together to form a smaller focus set.

This smaller focus set is then reclustered on the fly, or scattered, to produce eight new clusters covering the reduced collection. Because the reduced collection contains a subset of the articles, these new clusters reveal a finer level of detail than the original eight. The articles on the Iraqi invasion and some of the oil articles have now been separated into clusters discussing the U.S. military deployment, the effects of the invasion upon the oil market, and hostages in Kuwait.

Suppose the user adequately understands these major stories, but wishes to discover what happened in other parts of the world. The user therefore selects the "Pakistan" cluster, which also contains other foreign political stories, and a cluster containing articles about Africa. This reveals a number of specific international situations as well as a small collection of miscellaneous international articles. The user thus learns of a coup in Pakistan and about hostages being taken in Trinidad, stories otherwise lost among the more major stories of that month.

Figure 3:
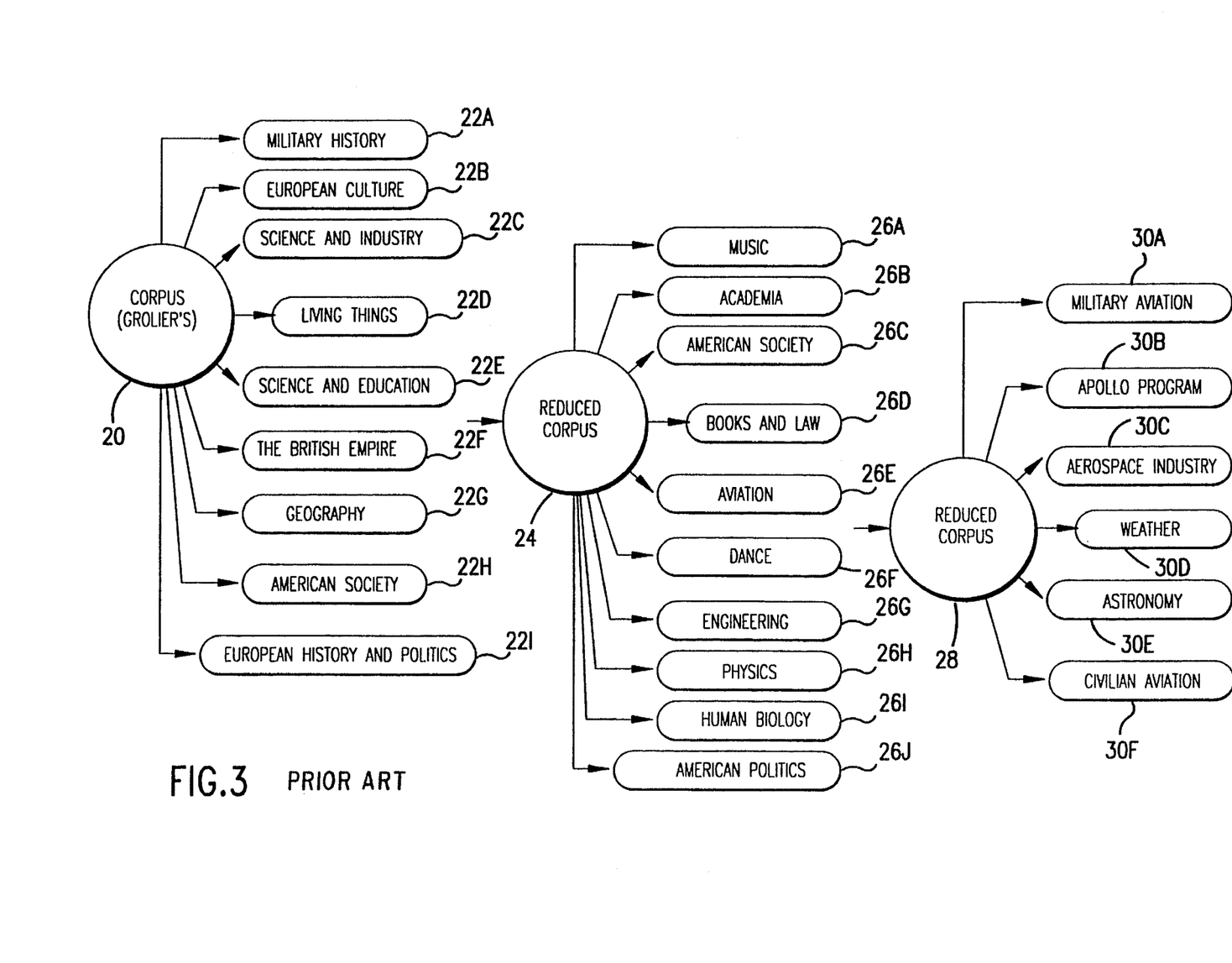
FIG. 3 is an illustrative diagram of the Scatter/Gather document browsing method being applied to a specific corpus of documents.

A further illustration of Scatter/Gather in operation appears in FIG. 3. Text collection (or focus set) 20 is an online-version of Grolier's encyclopedia (roughly 64 Megabytes of ASCII text) with each of the twenty-seven thousand articles treated as a separate document. Suppose the user is interested in investigating the role of women in the exploration of space. Rather than attempting to express this information need as a formal query, the user instead selects a number of top-level clusters referenced as 22A-I that, from their description, seem relevant to the topic of interest. In this case, the user selects the clusters 22A, 22C and 22H labeled "military history," "science and industry," and "American society" to form a reduced corpus (or focus set) 24 of the indicated subset of articles from Grolier's. (Note, the cluster labels are idealized in this illustration; the actual implementation produces cluster descriptions that are longer than would fit conveniently in this figure. The given labels, however, are reasonable glosses of topics described by actual cluster summaries.)

The reduced corpus is then reclustered on the fly to produce a new set of clusters 26A-J covering the reduced corpus 24. Since the reduced corpus contains a subset of the articles in Grolier's, these new clusters are at a finer level of detail than the top-level clusters. The user again selects clusters of interest. In this case, these include clusters 26E, 26G and 26H labeled "aviation," "engineering," and "physics." Again, a further reduced corpus 28 is formed and reclustered. The final set of clusters 30A-F includes clusters labeled for "military aviation," "Apollo program," "aerospace industry, .... weather," "astronomy" and "civil aviation." At this stage the clusters are small enough for direct perusal via an exhaustive list of article titles. Assuming at least one article of interest is found, the user may find more articles of a similar nature in the same cluster, or may use a directed search method, based on the vocabulary of the located article or of the cluster description, to find additional articles.

Previous work in document clustering generally concentrated on procedures with running times that are quadratic relative to the collection size, for example, the classic SLINK single-linkage clustering procedure (see Sibson, R., "SLINK: An Optimally Efficient Algorithm for the Single Link Cluster Method," *Computer Journal*, 16:3034, 1973). Quadratic running time is too time-inefficient for interactive manipulation of large collections, containing thousands of documents—days or even months may be required to perform a single clustering.

Linear procedures, such as those described in application Ser. No. 07/790,316,: now U.S. Pat. No. 5,442,778, reduce the time required to only a few minutes, fast enough for searching moderately large collections and the results of broad word-based queries. (A rate of approximately 3000 documents per minute may be achieved on a Sun Microsystems SPARCSTATION 2 using Scatter/Gather.) Even linear-time clustering, however, is too slow to support interactive browsing of very large document collections. This is particularly apparent when one considers applying Scatter/Gather to the TIPSTER collection, a DARPA standard for text retrieval evaluation containing about 750,000 documents (See Harmon, D., "The TIPSTER Evaluation Corpus", CDROM Disks of Computer Readable Text, 1992, available from the Linguistic Data Consortium). At 3000 documents per minute, this requires around four hours to scatter—far too long to be considered interactive.

SUMMARY OF THE INVENTION

It is an object of the invention to accelerate document browsing methods, such as, for example, the Scatter/Gather procedure, allowing the procedure to be used with arbitrarily large corpora of documents.

It is a further object of the invention to allow clustering of a large number of documents within a time suitable for user interaction.

To achieve these and other objects and advantages, and to overcome the shortcomings set forth above, a method of processing a corpus of electronically stored documents is presented, in which a focus set comprised of at least one initial metadocument, representative of a plurality of documents, is expanded into a plurality of subsequent metadocuments. The subsequent metadocuments are then clustered into a predetermined number of new metadocuments. for summary and presentation to a user.

The number of subsequent metadocuments into which the initial metadocument is expanded is approximately equal to a predetermined maximum number. Defining the maximum number limits the degree of expansion compared to previous methods that expanded groups of documents to the document level. The present invention accelerates the expanding and clustering steps, allowing processing of arbitrarily large corpora of documents. The predetermined maximum number may be determined in accordance with a desired interaction-time constraint.

The at least one initial metadocument may be a single metadocument, created by a partitional clustering method and representative of an entire corpus of documents. The at least one initial metadocument may alternatively be a plurality of metadocuments selected by a user of the Scatter/Gather procedure.

Preferably, the documents are organized as a cluster hierarchy having individual documents or leaves, usually a single root node, and a plurality of internal nodes, each node having a plurality of children corresponding to leaves (individual documents) or other internal nodes, and a single parent corresponding to another internal node or the root node. Closely related documents have a common internal node low down in the tree (near the leaves). Each node (root or internal) can be considered to be a metadocument because it represents plural documents.

A focus set (the corpus or selected groupings chosen by a user) is expanded by choosing a metadocument in the focus set that represents the most individual documents, and then expanding the chosen metadocument into subsequent metadocuments that descend from the chosen metadocument in the tree. The choosing step is repeated as long as the total number of metadocuments in the focus set does not exceed the predetermined maximum number of subsequent metadocuments. Thus, the duration of the expanding step is limited by limiting the total number of metadocuments created in the expanding step.

After clustering the metadocuments in the focus set into the new metadocuments, the procedure creates summaries of the new metadocuments. Each summary. includes a fixed number of topical words occurring most often in each new metadocument and the title of at least one typical document within each new metadocument. After the summaries are presented to a user for selection, the focus set is redefined to include only those new metadocuments that the user selects.

The titles included in each summary are determined in accordance with sets of word-frequency pairs associated with each document and new metadocument. For efficiency, the set of word-frequency pairs of each metadocument is truncated to include only those pairs with the highest frequencies. Consequently, clustering the metadocuments in the focus set occurs within a predetermined amount of time, regardless of the number of individual documents actually represented by a particular metadocument.

BRIEF DESCRIPTION OF THE DRAWINGS

The invention will be described in detail with reference to the following drawings, in which like reference numerals refer to like elements.

DETAILED DESCRIPTION OF PREFERRED EMBODIMENTS

Document Corpus Browsing System

Figure 1:
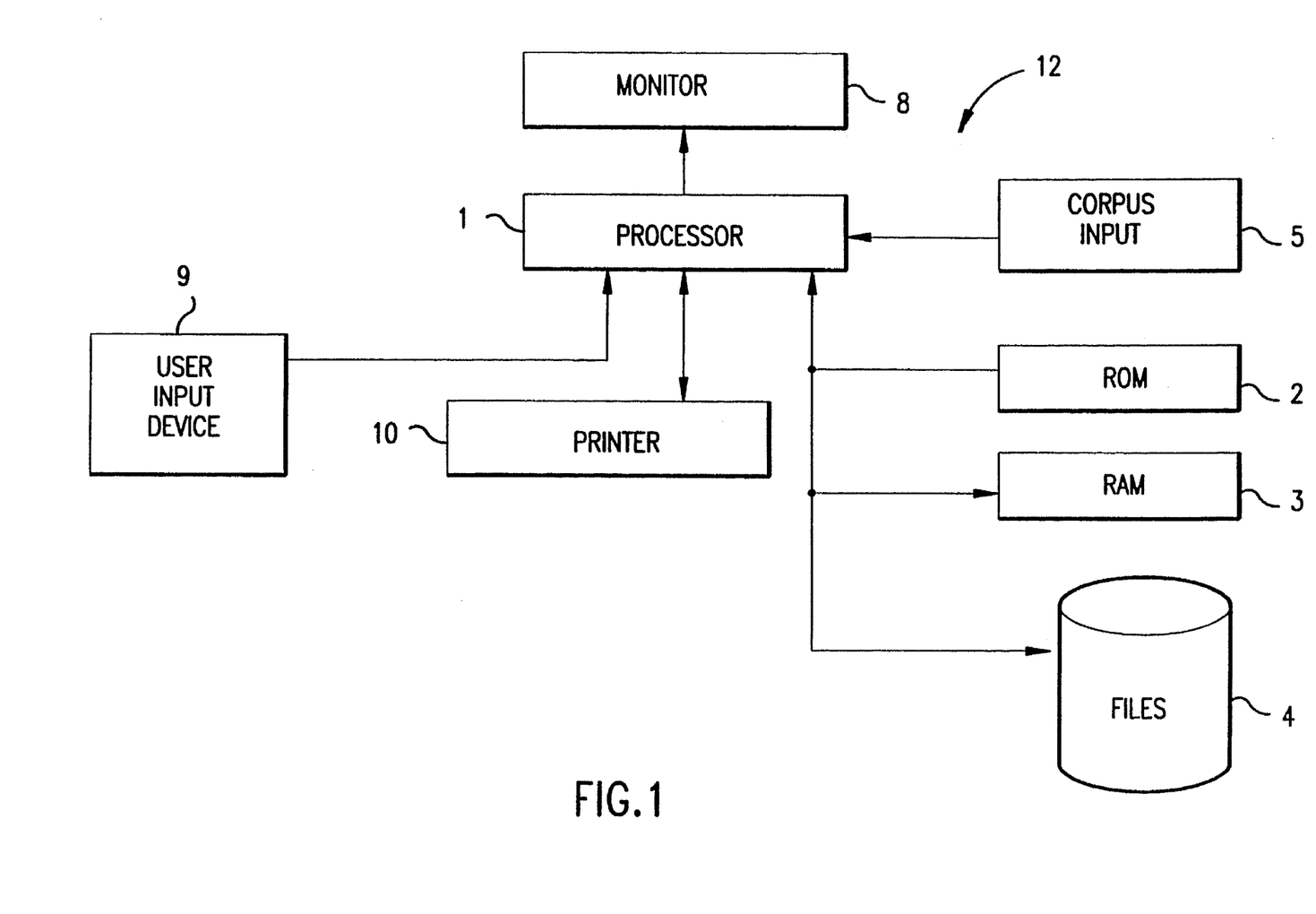
FIG. 1 is a block diagram of the hardware components used to practice the present invention.

The present invention can be implemented in a document corpus browsing system 12, as illustrated in the block diagram of FIG. 1. The system includes a central. processing unit (microprocessor) 1 for receiving signals from and outputting signals to various other components of the system according to one or more programs run on microprocessor 1. The system also includes a read only memory (ROM) 2 for storing operating programs, a random access memory (RAM) 3 for running the various operating programs, and optional additional files 4 for overflow and for storage of partitioned corpora.

Prior to performing a browsing procedure, a document corpus is input from a corpus input 5. The corpus is then partitioned by processor 1. Monitor 8 is provided for displaying results of partitioning procedures, and for permitting the user to interface with the operating programs. A user input device 9 such as, for example, a mouse, a keyboard, a touch screen or combinations thereof is provided for the operator to input commands. A printer 10 can also be provided so that hard copies of documents, as well as print-outs containing Cluster Digest summaries, can be printed.

Figure 2:
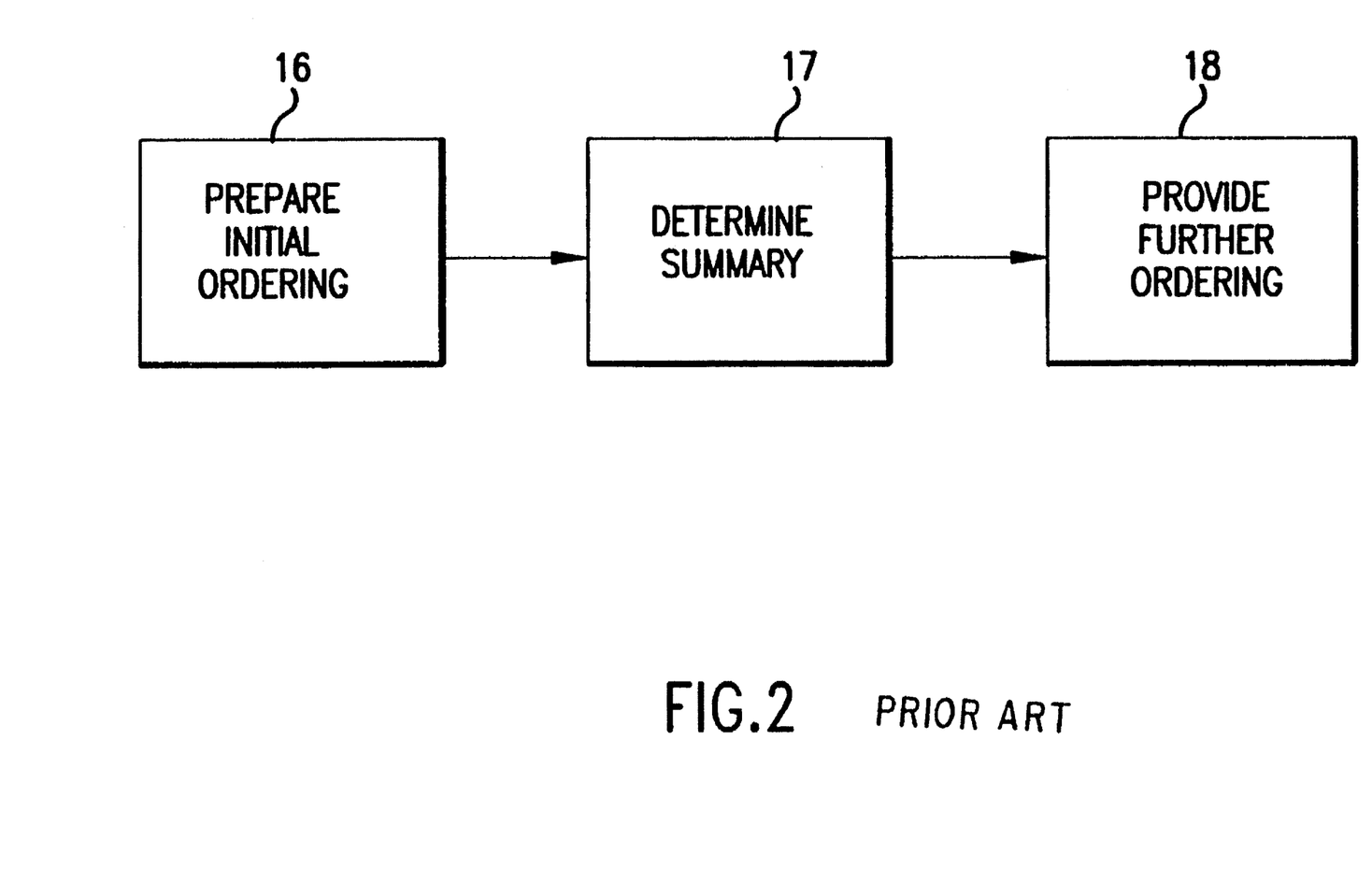
FIG. 2 is a high level flowchart of the Scatter/Gather document browsing method.

The system 12 is based in a digital computer that can prepare an initial document ordering, as shown in step 16 of FIG. 2. The initial ordering can be prepared by using, for example, the Fractionation method disclosed in application Ser. No. 07/790,316, now U.S. Pat. No. 5,442,778, which application is incorporated herein by reference.

The system 12 also determines a summary of the initial ordering of the corpus, as shown in step 17, which can be displayed to the user via monitor 8 or printer 10 for user interaction. This summary can be determined by using, for example, the Cluster Digest method disclosed in application Ser. No. 07/790,316, now U.S. Pat. No. 5,442,778.

After receiving appropriate instructions from a user via user input device 9, the system 12 can perform a further ordering of the corpus, as shown in step 18. This further ordering can be provided by using, for example, the Buckshot method described in application No. 07/790,316, now U.S. Pat. No. 5,442,778.

A desired number of iterations of steps 17–18 then occurs, further narrowing the corpus. Eventually, individual documents might be examined or some directed search tool applied to the restricted corpus.

Metadocuments in a Cluster Hierarchy

In the present invention, a predetermined number of metadocuments, instead of a non-predetermined number of individual documents, are used in the procedures for cluster, ing or scattering. A metadocument represents a plurality of individual documents descending from the metadocument in a tree, such as tree 81 of FIGS. 7–10.

Figure 7:
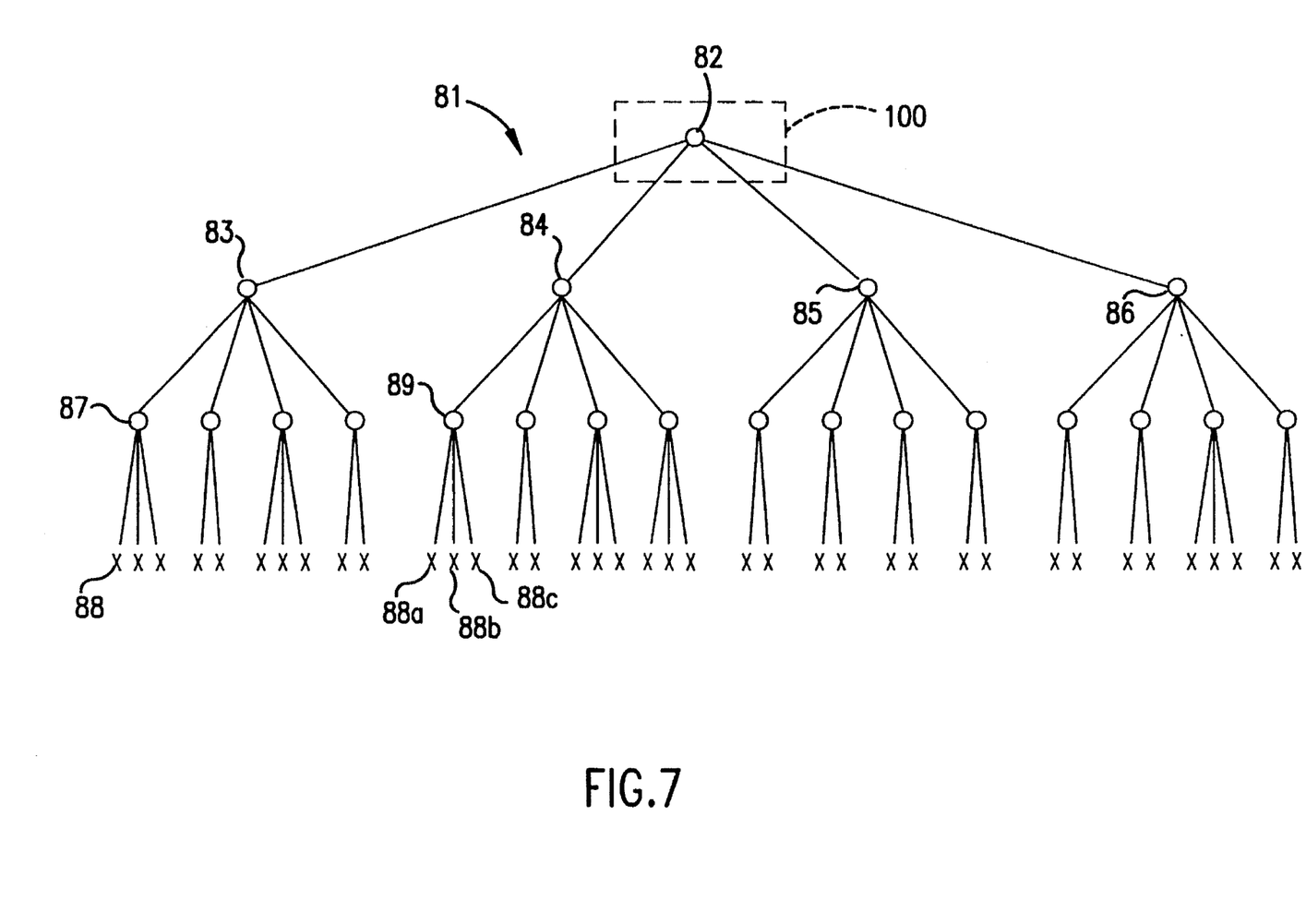
FIGS. 7–10 show trees and the changing contents of a focus set according to a preferred embodiment of the invention.

In FIG. 7, nodes 82–87 of tree 81 are metadocuments that represent individual documents such as documents 88. For example, in FIG. 7, node 89 is an internal node that has three children—documents 88a, 88b, 88c. Internal node 89 is also a child of internal node 84, which is a child of root node 82. Root node 82 is a metadocument representing the entire document collection. Metadocuments 83–86 descend directly from metadocument 82, and a further level of metadocuments 87 descends directly from metadocuments 83–86. Finally, individual documehts 88, or leaves of the tree, descend directly from metadocuments 87. Tree 81 is greatly simplified for illustration purposes; a large corpus has too many individual documents and levels of metadocuments to be conveniently illustrated. FIGS. 7–10 are described in greater detail below.

The Cluster Refinement Hypothesis

Suppose 10,000 documents are to be clustered into ten topic-related groups, or clusters. Suppose further that an original clustering of the same 10,000 documents into, for example, 500 clusters is already available. All the documents iFi a given one of the 500 clusters will likely appear in the same one of the desired ten clusters, because documents extremely similar to each other usually appear in the same cluster. In other words, documents similar enough to be clustered together in a fine-grained clustering will be clustered together in a coarse-grained clustering. This can be referred to as the Cluster Refinement Hypothesis.

The present invention treats the existing clusters as metadocuments, which together form a condensed representation of the entire corpus. Instead of clustering all of the individual documents directly, the invention clusters the metadocuments that represent them. In the above example, instead of clustering the 10,000 individual documents, the invention could cluster the 500 metadocuments. Under the Cluster Refinement Hypothesis, metadocument clustering and individual document clustering yield similar results.

Browsing the Corpus

Figure 5:
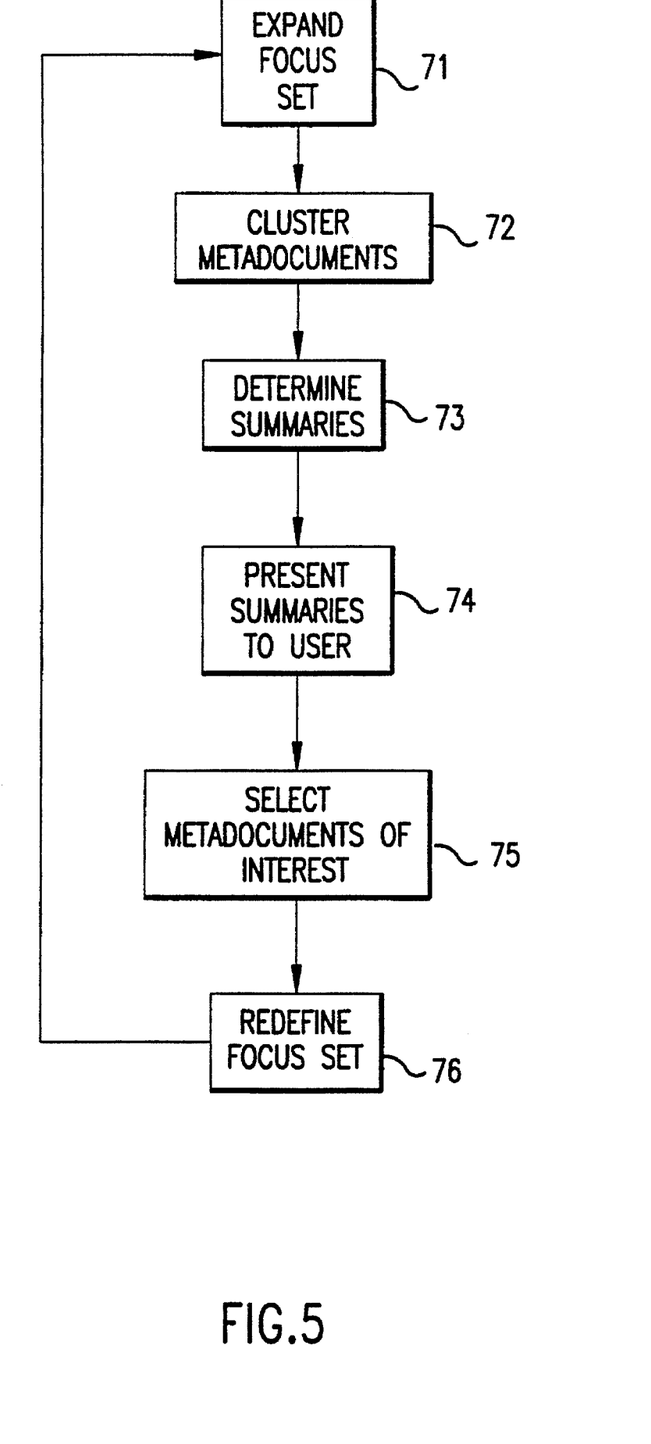
FIG. 5 is a high level flowchart showing the steps of the present invention.

The present invention will now be further described with reference to FIG. 5. A user begins with a focus set of at least one initial metadocument. For a first iteration, the focus set contains the single, root metadocument representing the entire document collection (corpus). For later iterations, the focus set contains metadocuments that each represent only a part of the collection. The focus set is expanded in step 71, by expanding the initial metadocument or metadocuments into a plurality of subsequent metadocuments. The number of subsequent metadocuments is approximately equal to a predetermined maximum number, which could be for example, 500.

The subsequent metadocuments are scattered or clustered in step 72 into a predetermined number (for example, 10) of new metadocuments, the predetermined number of new metadocuments being less than the predetermined maximum number of subsequent metadocuments. The new metadocuments are sqmmarized in step 73, and the summaries then presented to the user in step 74, using, for example, a printer or monitor. In step 75, the user can select one or more of the presented, new metadocuments based on their summaries, yielding a subset of the new metadocuments. The focus set is then redefined as this subset in step 76. The entire process may be repeated using the redefined focus set, at the user's option.

Defining an approximate maximum number of subsequent metadocuments (generated in the expanding step 71), as described above, accelerates both the expanding step 71 and the clustering step 72. This in turn allows processing of arbitrarily large corpora. Further, because the number of subsequent metadocuments to be clustered is approximately predetermined, clustering can occur in a predetermined (constant) amount of time regardless of the size of the corpus. In previous systems, including the original Scatter/Gather system of application Ser. No. 07/790,316, now U.S. Pat. No. 5,442,778, expanding did not occur. Instead, each time the clustering procedure was invoked (to generate the new document clusters for later summarization and display), every individual document in the focus set (either the entire corpus or the documents in each user-selected grouping) was used. This is analogous to using the present invention to expand in an unrestricted manner to the document level every time clustering occurs.

In a preferred embodiment, the predetermined maximum number of subsequent metadocuments is determined so that the expanding and clustering steps are completed within a predetermined time constraint. Limiting the total number of subsequent metadocuments generated from a focus set during expansion allows these subsequent metadocuments, and thus the focus set, to be clustered within the time constraint, assuring that the running time of the procedure will not prohibit user-interactive functioning.

Expanding the Focus Set

A preferred embodiment of expanding step 71 will now be described with reference to FIGS. 6 and 7–10.

Figure 6:
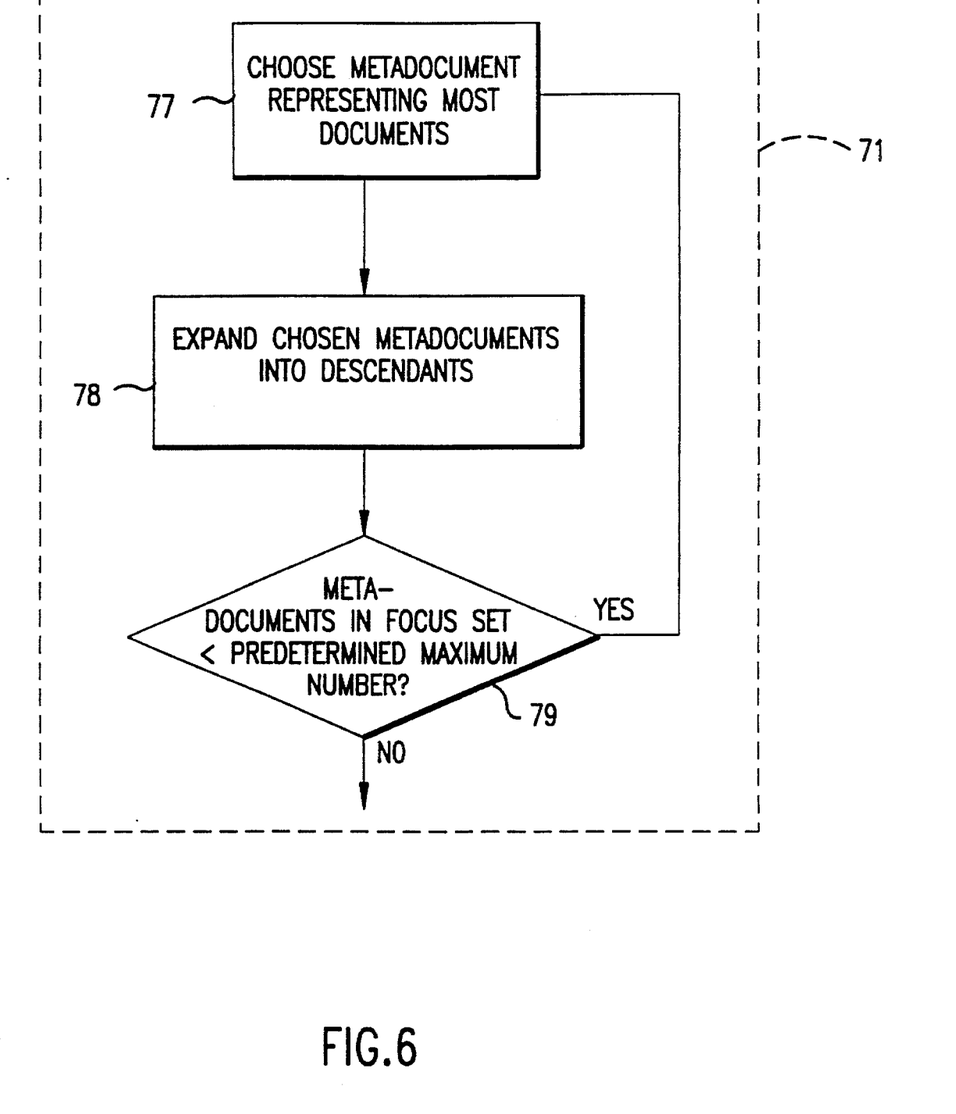
FIG. 6 is a flowchart showing a preferred embodiment of the expanding step of FIG. 5.

As shown in FIG. 6, the metadocument in the focus set that represents the most individual documents, that is, the metadocument that has the most leaves, is chosen in step 77. This chosen metadocument is then expanded into subsequent metadocuments in step 78 by replacing it with its direct descendants in the tree. If, after step 78, the number of metadocuments in the focus set is less than a predetermined maximum number of metadocuments (for example, 500) in step 79, choosing and expanding steps 77, 78 are repeated. If the result of step 79 is negative, flow proceeds to step 72 in FIG. 5.

Figure 8:
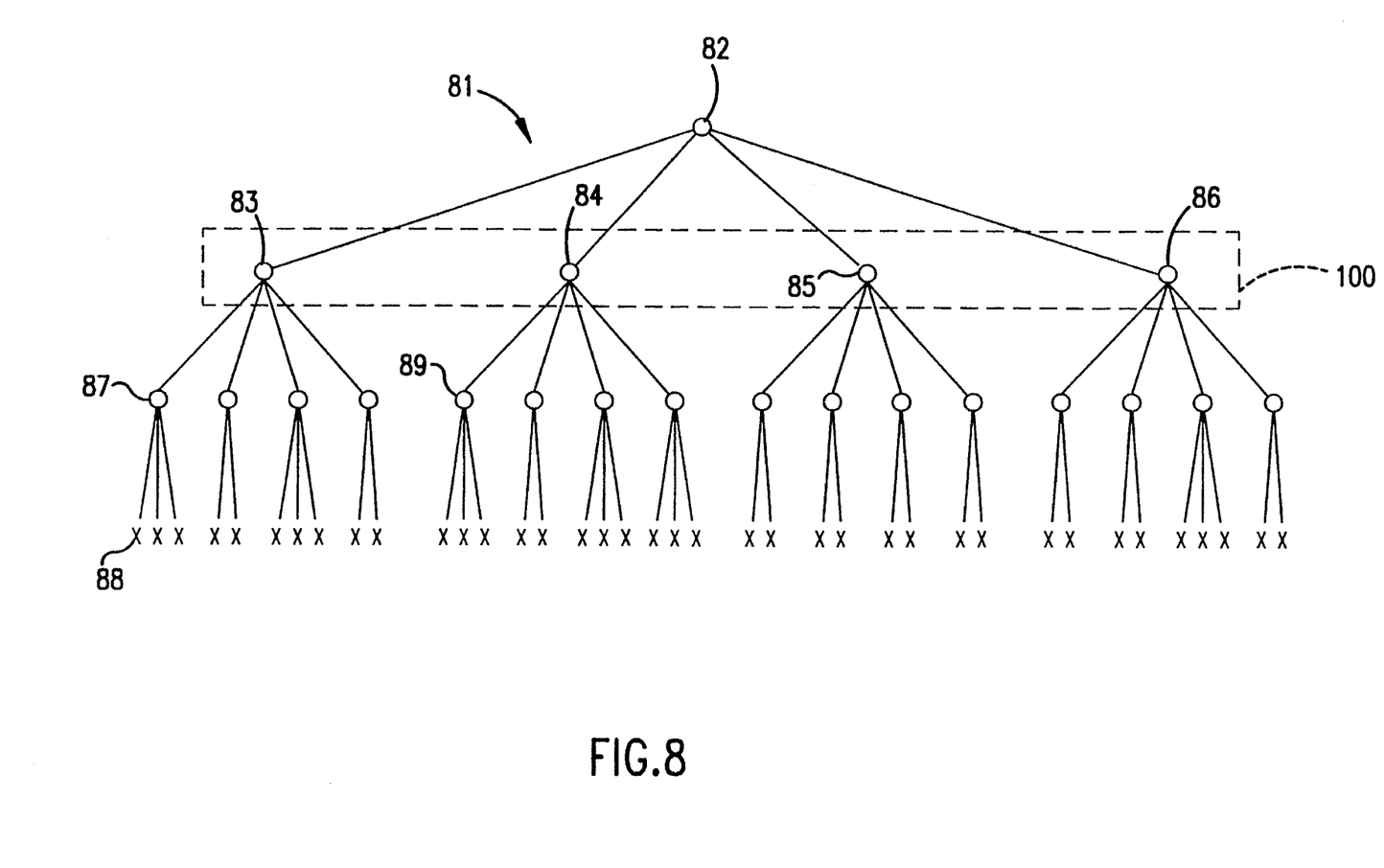

For the first iteration of steps 77–79, focus set 100 of FIG. 7 contains only the root node or metadocument 82, representing the entire document collection (or corpus). Of course, during the first iteration, this metadocument 82 is chosen in step 77, as it is the only metadocument in the focus set. In step 78, metadocument 82 is expanded into its direct descendants 83–86; these descendants replace metadocument 82 in the focus set 100, as shown in FIG. 8. Focus set 100 then contains metadocuments 83–86.

Assuming the number of metadocuments in the focus set is less than the predetermined maximum number in step 79, choosing step 77 is repeated with respect to the focus set 100 of FIG. 8. Of metadocuments 83–86, metadocument 84 represents the most individual documents 88. Metadocument 84 represents eleven individual documents, whereas metadocuments 83, 85, and 86 respectively represent ten, eight and nine individual documents. Metadocument 84 is therefore chosen and expanded into its descendant metadocuments 89–92, so that focus set 100 contains metadocuments 83, 85–86, and 89–92, as shown in FIG. 9.

Figure 9:
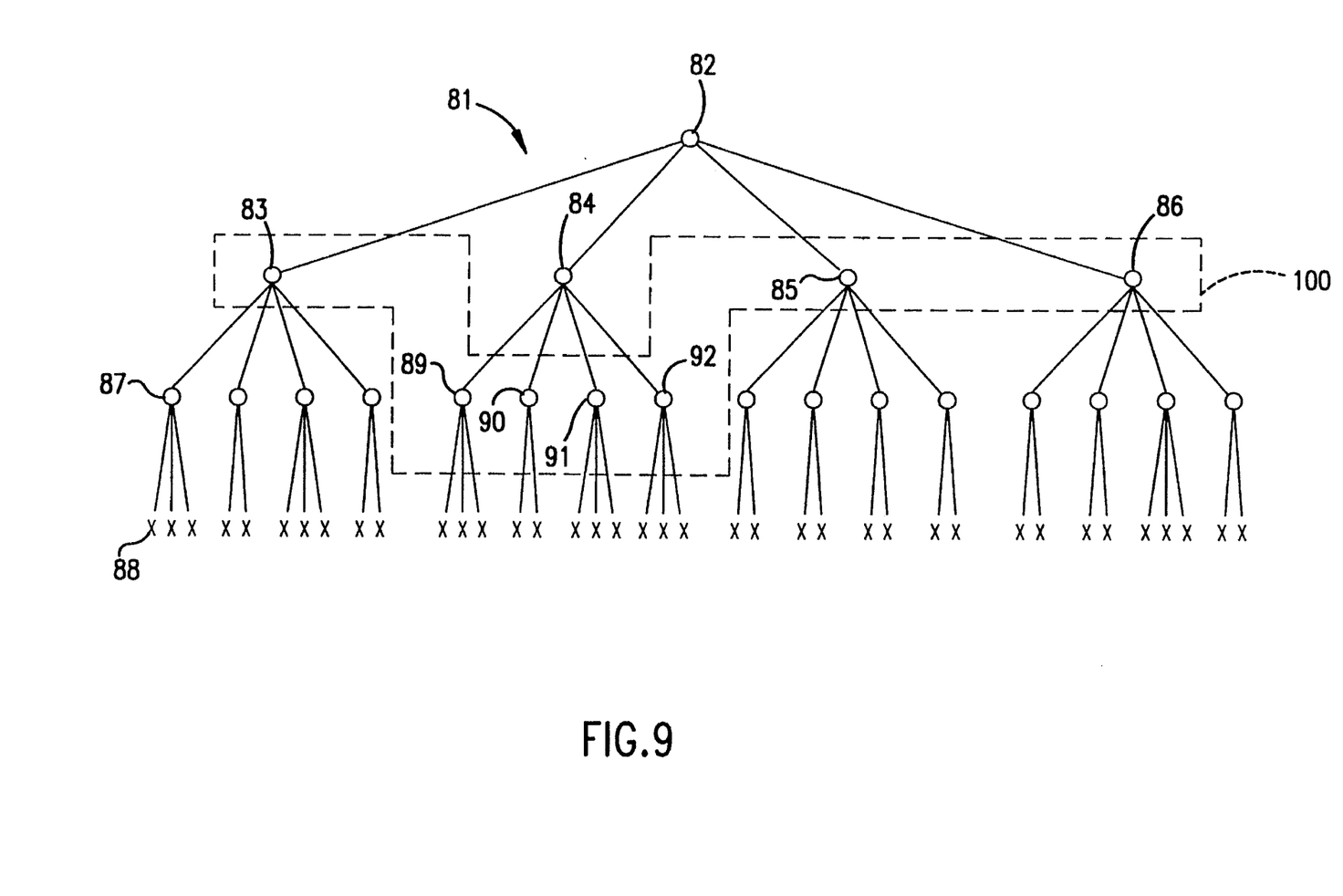
Figure 10:
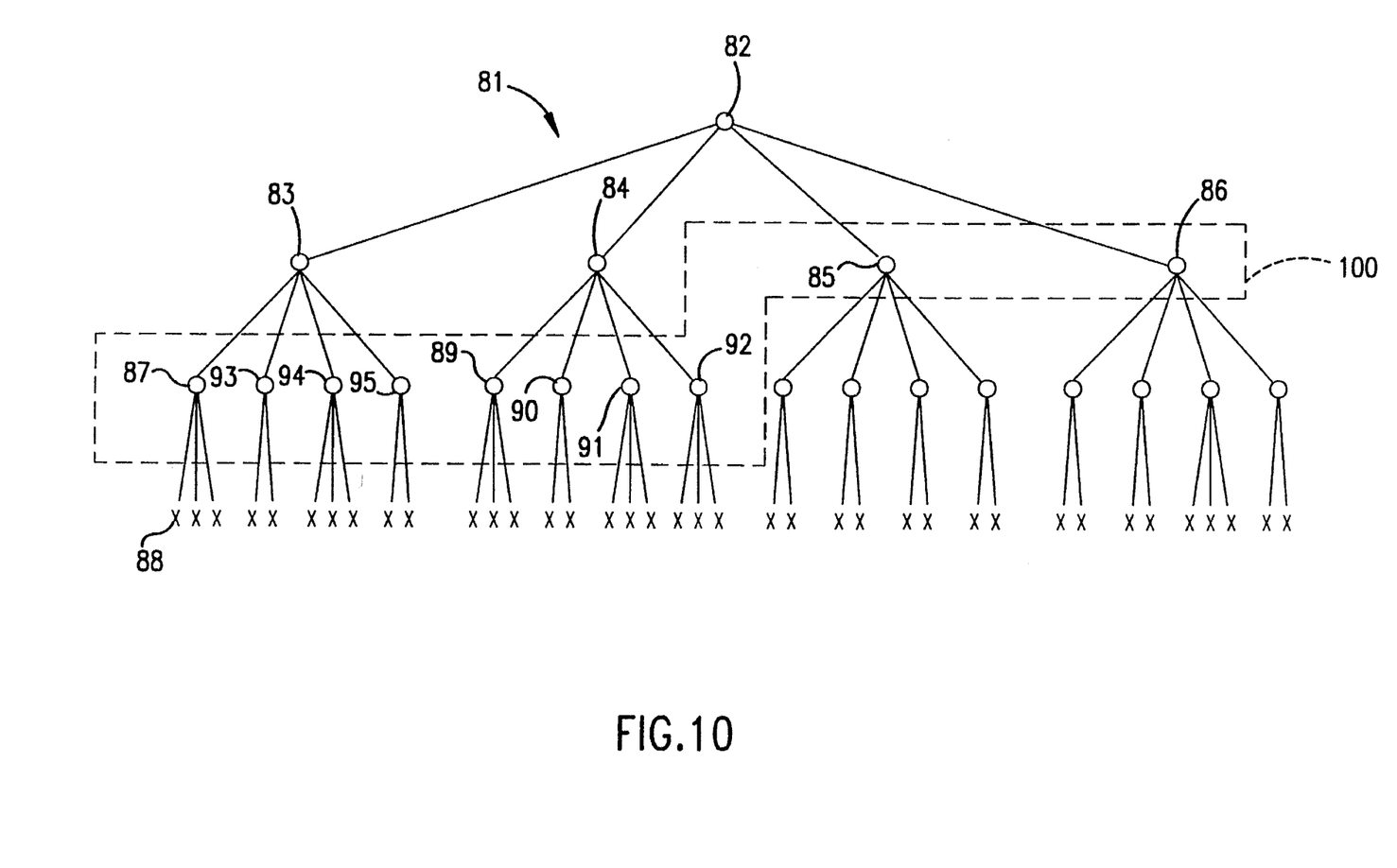

If the predetermined maximum number has not yet been reached in step 79, step 77 is repeated with respect to the focus set 100 of FIG. 9. Metadocument 83, representing the most individual documents, is chosen and expanded into its descendant metadocuments 87 and 93–95 in step 74. Focus set 100 then contains metadocuments 85–87 and 89–95, as shown in FIG. 10.

The process of FIG. 6 continues as long as the number of metadocuments (subsequent metadocuments) in the focus set is less than the predetermined maximum number. When the predetermined maximum number is high enough, the focus set may eventually include individual documents. In that case, step 79 will determine whether the total number of metadocuments and individual documents is less than the predetermined maximum number. This situation, however, usually will not occur, particularly during the first few iterations of the Scatter/Gather process.

Generating the Tree

A preferred method of generating tree 81, that is, generating the original hierarchy of metadocuments of a document corpus, will now be described.

Tree 81 is a type of cluster hierarchy, the output of an agglomerative clustering procedure. Agglomerative clustering procedures are typically quadratic in time because at each step they merge the most similar pair of documents determined globally, that is, with respect to the entire document collection. In very large document collections such as Tipster, these procedures are prohibitively slow even as a preprocessing step. A different approach is therefore desirable.

Partitional clustering procedures such as Buckshot or Fractionation, described in patent application Ser No. 07/790,316, now U.S. Pat. No. 5,442,778, cluster documents into k groups in time proportional to kn, where n is the total number of documents. A preferred embodiment of the present invention applies partitional procedures in generating the cluster hierarchy or tree 81 in the manner described below.

The chosen partitional procedure is recursively applied to each group in a partition until individual documents are reached. Given a branching factor, k, the entire document collection is partitioned into k subcollections in time proportional to kn. Each of these subcollections is then treated as a collection to be partitioned in turn into k subsubcollections, and so on. At each level of the recursion, corresponding to each level of tree 81, the entire document collection is represented. In the simplified tree of FIGS. 7–10, for example, the branching factor k is equal to 4. Root metadocument 82 is partitioned into 4 subcollections 83–86, and each of these four subcollections is partitioned in 4 subsubcollections.

The total time cost to perform all clusterings at each level is proportional to kn. If each clustering step is balanced, that is, if every cluster of a particular level contains a constant fraction of the items in the collection, then there are a total number of levels proportional to log(n). Hence, the entire procedure can be performed in a time proportional to knlog(n).

Although this tree generating procedure performs no global similarity analysis, any two similar documents will likely remain together through many levels of subclustering, sharing a common ancestor much lower in the tree than two dissimilar documents.

Determining Document Similarity

The clustering procedure used in the Scatter/Gather process must be modified somewhat for use with metadocuments instead of individual documents. For clustering purposes, Scatter/Gather represents individual documents as sets of word-frequency pairs. Each pair contains a word appearing in the particular document coupled with the number of times the word appears in that document. Each set of word-frequency pairs is represented as a high dimensional vector, or profile, and similarity between individual documents is defined as the cosine between vectors.

In the present invention, metadocuments are also represented as profiles or vectors, i.e. sets of wordfrequency pairs, by simply summing the profiles of their descendant individual documents. Similarity between metadocuments is also defined as the cosine between their respective vectors. Each metadocument is therefore associated with a profile that captures its word content, that is, the word content of the documents represented by that metadocument. Profiles of metadocuments high in tree 81, formed by summing numerous individual document profiles, contain many entries. The profile of root metadocument 82 is fully occupied, representing every word that occurs in the entire collection. This has implications for memory requirements, and more importantly, affects clustering time.

Truncating Metadocument Profiles

The measure of kn time, described above, is in fact a measure of kn similarity comparisons. The similarity measure used is a cosine measure of document profiles, as discussed above, and can thus be determined in time linear in the profile sizes. Thus, a similarity determination can be treated as a constant time operation when considering only individual documents because their profiles are all of bounded size. As profiles become increasingly large, however, the time to determine similarities also increases. It has been found that clustering metadocuments, with their dense profiles, takes almost as much time as clustering the individual documents they represent.

To solve this problem, a preferred embodiment of the invention truncates the metadocument profiles to include only the most topical, that is, the most highly weighted, word-frequency pairs. Only those word-frequency pairs with the highest frequency components are included in the metadocument profiles. All profiles, i.e. all sets of metadocument word-frequency pairs, are truncated to become the same length. The length can be selected based on the time constraints of the user. The less time available, the smaller the length. Clustering a certain number of metadocuments occurs, therefore, in a known amount of time, regardless of the actual size of the metadocuments, that is, the number of individual documents represented by each metadocument.

Truncation is advantageous in that the total amount of storage required to represent the cluster hierarchy is linear in the size of the collection. There can be no more internal nodes than there are leaves, and because the storage required for each internal node is constant, the total storage required is proportional to the number of leaves.

For example, the fifty most topical terms can be included in the truncated profile. These truncated profiles are effective descriptions of the metadocuments. This is not surprising, as metadocuments are presented to a user by listing their most topical terms - a list analogous to a truncated profile.

Presenting Metadocuments to a User

The original Scatter/Gather routine for summarizing the new groupings (which are metadocuments) for presenting the table of contents to the user should also be modified for use with the invention. Presenting the metadocuments to a user will now be described. As shown in FIG. 5, summaries of the new metadocuments are determined at step 73. The summaries are presented to a user in step 74, and in step 75, the user selects metadocuments of interest based on the summaries. As described in patent Application Ser. No. 07/790,316, now U.S. Pat. No. 5,442,778, a digesting procedure may be employed to summarize a cluster of individual documents. In the present invention, digesting is extended to metadocuments.

Summaries presented to a user comprise two complimentary components: a list of topical words, defined as those words with the highest word frequencies, and a list of typical titles.

Determining the topical words for a particular metadocument depends on the profile, that is, the set of word-frequency pairs, for that metadocument. The most highly weighted entries correspond to the topical words. This is similar to the original technique used with individual documents.

To determine which title or titles are included in a particular metadocument summary, each metadocument in tree 81 is assigned the title of at least one typical document contained therein. A typical document for a metadocument is a document that descends from the particular metadocument in question and has a profile most similar to that metadocument's profile. To determine the typical document, the set of word-frequency pairs associated with a particular metadocument is compared to the sets of word-frequency pairs associated with the individual documents descending from that metadocument. The individual document having the word-frequency pair set most similar to the metadocument word-frequency pair set is chosen as the typical document. One or more typical documents can be found for each metadocument, and its/their title(s) used in the metadocument summary.

The time needed to determine the profile and typical document of a metadocument representing c individual documents is proportional to c. Thus, the running time to build the entire hierarchy remains proportional to knlog(n) even with these additional computations.

The titles of the typical documents, as determined above, are then presented to the user along with the topical words of each new metadocument determined by the clustering routine. Based on the summaries of the new metadocuments presented, the user selects those new metadocuments of further interest, defining a new focus set and allowing further iterations of the procedure.

Demonstration

The DARPA Tipster collection contains over 700,000 documents, occupying 2.1 gigabytes of text. There are over a million unique words in Tipster, with nearly a half a million occurring in more than one document.

The construction of a hierarchy for Tipster required forty hours of computation on a Sun SPARCStation 10. Approximately 210 megabytes of disk space were required to store the truncated profiles of the hierarchy—10% of the size of the text. The clustering steps of the present invention required approximately 20 seconds, using an expansion constraint, i.e., the predetermined maximum number of step 79, of 200 metadocuments.

The Tipster collection contains AP Newswire and Wall Street Journal articles, Department of Energy abstracts, Federal Register issues, and text from Ziff Davis' "Computer Select" disks. Although this basic knowledge is useful, it would be helpful to know more about the collection before directly searching it. Pertinent questions include: What is the difference in coverage between the Wall Street Journal and the AP Newswire? What does "Computer Select" contain? What is a Department of Energy abstract? What is in the Federal Registry? These questions could be answered by randomly selecting some articles from each collection and reading them, but the accelerated Scatter/Gather procedure of the present invention provides a more thorough method.

An initial scattering of the entire collection into 5 metadocuments appears below:

---

0(77235) section, rule, public, office, agency, action, regulation, order, req

| | | |
|---|---|---|
| FR: | General Services Administration Acquisition | (information, section, servic) |
| FR: | Community Development Block Grants | (section, federal, rule, regu) |
| FR: | Privacy Act of 1974: Notice of Systems of R | (information, file, office, a) |

1(153421) official, house, soviet, country, leader, bush, american, police, un

| | | |
|---|---|---|
| AP: | After 10 Years, States Still Falter on Camp | (state, percent, unite, natio) |
| AP: | URGENT | (state, u.s., unite, presiden) |
| AP: | Afghan President Asks America, Pakistan To | (government, official, u.s.,) |

2(179334) share, stock, trade, sale, sell, business, exchange, york, buy, cont

| | | |
|---|---|---|
| WSJ: | Dividend News: Penn Central Sets Payout, W | (company, share, million, sto) |
| WSJ: | Year-End Review of Bond Markets: Money Man | (company, market, million, fi) |
| WSJ: | Year-End Review of News Highlights: What W | (company, million, bank, busi) |

3(112900) user, software, computer, network, ibm, technology, version, line, p

| | | |
|---|---|---|
| ZF: | Sun's NeWSprint: a new way to print. (Softw | (user, program, software, net) |
| ZF: | 25 tough integration problems and solutions | (software, network, user, pro) |
| ZF: | Forecast 1989.&M; | (user, application, software,) |

4(220170) study, energy, present, temperature, test, describe, analysis, gas,

| | | |
|---|---|---|
| DOE: | This is a report on the development of a c | (design, process, data, heat,) |
| FR: | Energy Conservation Voluntary Performance S | (energy, fuel, development, p) |
| DOE: | Presents an experimental study of the wett | (coal, present, level, study,) |

---

The first line of each metadocument summary contains an identifier, the leaf-count of the cluster (in parentheses), and a list of topical terms from the metadoCument's profile. The next three lines present the titles of three typical metadocuments, the source (AP, DOE, FR, WSZ or ZF), and a list of topical terms in the typical document.

This top-level clustering roughly reproduces the division between the five Tipster sources. The clustering procedure of the present invention therefore indicates that the sources discuss disjoint topics.

Answers to some of the above questions are immediately obtained: The federal registry contains government regulations (cluster 0); the AP Newswire concentrates on political events (cluster 1); the Wall Street Journal concentrates on business news (cluster 2); the Ziff-Davis collection predominately covers computer-related products (cluster 3); DOE abstracts are technical studies about energy (cluster 4).

The AP Newswire and Wall Street Journal sources will now be more closely examined. Clusters (metadocuments) 1 and 2 are chosen and scattered into ten new clusters (new metadocuments). Prior to clustering into the ten new metadocuments, the two selected metadocuments were expanded into 200 subsequent metadocuments. The results of this operation are shown below:

0(18568) child, school, family, play, young, book, film, black, student, turn,

| | | |
|---|---|---|
| WSJ: | Missing in America: A Lost Brother Sends O | (time, home, think, house, fa) |
| AP: | AP WEEKEND ENTERTAINMENT AND ARTS | (play, time, film, movie, thi) |
| AP: | Italian Women Getting Ahead, Say Men Must C | (woman, man, time, think, cit) |

1(8196) court, case, judge, attorney, trail, sentence, prison, prosecutor, jur

| | | |
|---|---|---|
| AP: | Government Deciding Whether to Hold Second | (charge, case, trial, attorne) |
| AP880307-0033 | | (court, sentence, case, judge) |
| AP: | Kidnapping or Extradition? Overseas Drug Ar | (charge, court, u.s., arrest,) |

2(28954) police, fire, spokesman, army, officer, attack, Israeli, soldier, pal

| | | |
|---|---|---|
| AP: | Radicals Kill Six Riot Policemen: Roh Warns | (police, kill, official, gove) |
| AP: | URGENT | (city, report, government, of) |
| AP: | Police Deployment Stirs Racial Tensions In | (police, city, arrest, office) |

3(32778) index, fall, dollar, trader, future, yen, decline, volume, oil, board

| | | |
|---|---|---|
| WSJ: | World Stock Markets: Stronger Dollar and W | (stock, market, share, price,) |
| WSJ: | Abreast of the Market: Upward Mobility: | (stock, market, share, price,) |
| AP: | Eda: SUBS 16th graf pvs bgng Standard & Poo | (stock, market, index, trade,) |

4(128215) sale, business, executive, industry, quarter, unit, product, loss, r

| | | |
|---|---|---|
| WSJ: | Dividend News: Penn Central Sets Payout, W | (company, share, million, sto) |
| WSJ: | Who's News: Johnson Products' Chief Quits; | (company, million, executive,) |
| ZF: | Computer stocks fall led by IBM.&O; | (million, company, share, rev) |

5(29549) loan, term, debt, credit, reserve, mortgage, treasury, capital, asset

| | | |
|---|---|---|
| WSJ: | Credit Markets: Treasury Bonds Fall Again | (rate, bond, million, price,) |
| WSJ: | Financial Overhaul: Big Banks Would Get Va | (bank, loan, federal, rate, f) |
| WSJ: | Year-End Review of Markets and Finance: Wh | (billion, million, government) |

6(48287) soviet, country, unite, foreign, minister, union, war, communist, gor

| | | |
|---|---|---|
| AP: | Parties Meet to Salvage Government | (government, war, state, pres) |
| WSJ: | What's News - World Wide | (government, south, u.s., sta) |
| AP: | URGENT | (state, u.s., unite, presiden) |

7(18251) senate, committee, congress, white, rep, budget, office, program, cut

| | | |
|---|---|---|
| WSJ: | Budding Issue: Bush's Schedule Shows He Sp | (house, president, bush, sena) |
| WSJ: | Trade Measure Clears House By Big Margin - | (bill, house, senate, vote, c) |
| AP: | Senate Putting Cheney Nomination on Fast Tr | (house, federal, committee, c) |

8(5476) dukakis, presidential, jackson, vice, george, convention, michael, pol

| | | |
|---|---|---|
| AP: | Bush Says Dukakis Dividing Classes in Charg | (dukakis, bush, campaign, pre) |
| WSJ: | Campaign '88 - Democrat's Task: Dukakis M | (jackson, dukakis, campaign,) |
| AP: | Bentsen Questions Quayle Qualifications: Qu | (bush, quayle, president, vic) |

9(14481) fair, build, rain, northern, central, coast, southern, inch, temperat

| | | |
|---|---|---|
| AP: | Thunderstorms Follow Tornadoes: Record Cold | (city, state, build, area, fa) |
| AP: | After 10 Years, States Still Falter on Camp | (state, percent, unite, natio) |
| AP880901-0082 | | (state, study, time, present,) |

At this granularity, the Wall Street Journal and the AP newswire are shown to have a fair amount of overlap, though each predominates certain topics.

The clusters can be described as follows: (0) human interest and leisure; (1) legal affairs; (2) police actions; (3) markets; (4) companies; (5) finance; (6) foreign affairs; (7) congress; (8) presidential politics; and (9) regional news.

International affairs will now be concentrated upon by gathering clusters (metadocuments) 2 and 6 and rescattering. The resulting output is shown below:

0(6130) man, newspaper, child, family, case, charge, air, death, federal, prod

| | | |
|---|---|---|
| AP890507-0076 | | (report, board, safety, air,) |
| AP: | U.N. Group Reports 400 'Disappearances' In | (report, country, group, offi) |
| AP: | Rescuers Continue Search For Survivors, Fif | (official, report, news, agen) |

1(8341) trade, japan, market, import, export, billion, japanese, industry, eur

| | | |
|---|---|---|
| WSJ: | Major Nations Near an Accord on Capital Fl | (u.s., country, export, gover) |
| AP: | U.S. Would Welcome Free-Trade Treaty Talks | (trade, u.s., state, units, c) |
| FR: | Actions to Address Adverse Conditions Affec | (state, u.s., unite, country,) |

2(15256) iran, rebel, contra, iranian, iraq, north, noriega, panama, security,

| | | |
|---|---|---|
| WSJ: | Panama Bungle: U.S. Tries to Salvage Its M | (u.s., state, military, gover) |
| WSJ: | What's News - World-Wide | (government, u.s., official,) |
| AP: | With AM-Philippines, Bjt | (u.s., military, state, offic) |

-continued

3(11916) moscow, nuclear, weapon, missile, defense, europe, treaty, secretary,

| | | |
|---|---|---|
| WSJ: | - President's Power Is Slipping: Soviet | (soviet, u.s., president, off) |
| AP: | US-Soviet Summit Not a Priority, White Hous | (soviet, bush, president, sta) |
| AP: | Gorbachev Arrives In NY, Urges Expanded Sup | (soviet, u.s., state, preside) |

4(8558) party, election, opposition, vote, load, reform, german, rule, parliam

| | | |
|---|---|---|
| AP: | Premier Says He Favors Non-Communists in Go | (government, party, leader, o) |
| AP: | Communists Give Themselves New Name; Plan N | (party, communist, leader, re) |
| AP: | Opposition Labels Election A Farce | (party, election, vote, gover) |

5(2854) israeli, palestinian, israel, arab, bank, gaza, occupy, plo, uprise, s

| | | |
|---|---|---|
| AP: | Israeli Leaders See Movement in Baker Modif | (palestinian, israeli, israel) |
| AP: | Palm Sunday Procession Is Canceled in Jerus | (palestinian, israeli, israel) |
| AP: | Israeli Troops Kill Two Palestinians; Strik | (palestinian, israeli, arab,) |

6(13383) police, man, officer, arrest, car, charge, death, protest, night, for

| | | |
|---|---|---|
| AP: | Man Shot At End of High-Speed Chase | (police, officer, report, man) |
| AP: | Police Confirm Arrest of Ex-Detective in Sl | (police, government, official) |
| AP: | Bloody Night in Copenhagen | (police, man, house, woman, h) |

7(5314) damage, build, firefighter, burn, police, resident, blaze, service, ce

| | | |
|---|---|---|
| AP: | People Return to Homes As Fire Contained | (fire, official, firefighter,) |
| AP: | Fourteen More Deaths From Disease in Capita | (report, state, official, new) |
| AP: | Fire Kills 16 at High-Rise Retirement Home; | (fire, house, build, home, fi) |

8(3330) plane, flight, air, crash, airline, airport, pilot, passenger, jet, ai

| | | |
|---|---|---|
| AP: | Airliner Crashes in Iowa with 298 on Board, | (plane, flight, airline, airp) |
| AP: | 13 Die But 94 Others Brave Smoke and Fire T | (plane, crash, air, flight, o) |
| AP: | Death Toll at Five From U.S. Jet Crash | (air, plane, u.s., force, pil) |

9(2159) patient, study, metal, structure, contain, compound, theory, cell, dos

| | | |
|---|---|---|
| DOE: | The aim is to define representations of th | (group, theory, coal, refs, g) |
| ZF: | People.&M; | (group, president, state, pol) |
| DOE: | The aim of the present study was to determ | (group, patient, cell, dose,) |

At this stage, some directed search tool might be applied to this restricted corpus. Or, more clusters might be selected for further scattering.

While the present invention has been described with reference to particular preferred embodiments, the invention is not limited to the specific examples given. Other embodiments and modifications can be made by those skilled in the art without departing from the spirit and scope of the invention as defined in the appended claims.

What is claimed is:

1. A method of processing a corpus of electronically stored documents, comprising the steps of:

expanding a focus set comprised of at least one initial metadocument, representative of a plurality of documents, into a plurality of subsequent metadocuments, a number of said subsequent metadocuments being approximately equal to a predetermined maximum number, said subsequent metadocuments being descendants of said at least one initial metadocument in a tree, said expanding step comprising, choosing a metadocument in the focus set that represents the most individual documents, and expanding the chosen metadocument into its descendant metadocuments; and clustering the subsequent metadocuments into a predetermined number of new metadocuments. the predetermined number of new metadocuments being less than the predetermined maximum numbers; and selecting the predetermined maximum number so that said expanding and clustering steps can be completed within a time constraint.

2. The method of claim 1, wherein said at least one initial metadocument is a single metadocument representative of said entire corpus of documents.

3. The method of claim 2, further including the step of creating said single metadocument by a partitional clustering method.

4. The method of claim 1, wherein said at least one initial metadocument is a plurality of metadocuments selected by a user.

5. The method of claim 1, wherein said descendant metadocuments descend immediately in the tree from the chosen metadocument.

6. The method of claim 1, further comprising the step of repeating the choosing step as long as the total number of metadocuments in the focus set does not exceed the predetermined maximum number.

7. The method of claim 1, wherein the clustering step takes a predetermined amount of time regardless of the number of documents represented by each metadocument.

8. The method of claim 1, further comprising the steps of:

determining a summary of the new metadocuments; and presenting the summary to a user.

9. The method of claim 8, further comprising the step of redefining the focus set to include only user-selected new metadocuments.

10. The method of claim 8, wherein the summary includes:

a fixed number of topical words that occur most often in each new metadocument; and the title of at least one typical document within each new metadocument.

11. The method of claim 10, wherein each document and each new metadocument is represented by a set of word-frequency pairs, and the at least one typical document within each new metadocument is defined by determining which document or documents within each new metadocument are represented by a set of word-frequency pairs most similar to the set of word-frequency pairs that represents each respective new metadocument.

12. The method of claim 1, wherein each document is represented as a set of word-frequency pairs, and wherein each metadocument is represented as a set of word-frequency pairs determined from a sum of sets of word-frequency pairs of documents represented by the metadocument.

13. The method of claim 12, wherein the set of word-frequency pairs of each metadocument includes only pairs with the highest frequencies, such that the clustering step takes a predetermined amount of time regardless of the number of documents represented by each metadocument.

* * * * *